United States Patent
Feng et al.

(10) Patent No.: US 11,363,542 B2
(45) Date of Patent: Jun. 14, 2022

(54) COMMUNICATION SYSTEM, METHOD AND COMPUTER PROGRAM PRODUCT THEREFOR

(71) Applicant: NATIONAL YANG MING CHIAO TUNG UNIVERSITY, Hsinchu (TW)

(72) Inventors: Kai-Ten Feng, Taipei (TW); Yung-Ting Huang, Taipei (TW); Chun-Hao Fang, Kinmen County (TW); Li-Hsiang Shen, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 17/182,699

(22) Filed: Feb. 23, 2021

(65) Prior Publication Data
US 2022/0124641 A1   Apr. 21, 2022

(30) Foreign Application Priority Data
Oct. 15, 2020   (TW) .................................. 109135653

(51) Int. Cl.
*H04W 52/36* (2009.01)
*H04W 52/24* (2009.01)
*H04W 52/22* (2009.01)
*H04W 52/60* (2009.01)

(52) U.S. Cl.
CPC ....... *H04W 52/367* (2013.01); *H04W 52/225* (2013.01); *H04W 52/241* (2013.01); *H04W 52/60* (2013.01)

(58) Field of Classification Search
CPC ..... H04W 16/10; H04W 28/16; H04W 16/14; H04W 72/044; H04W 74/0808; H04W 52/367; H04W 52/241; H04W 52/225; H04W 52/60
USPC ................... 455/422.1, 446, 452.1, 500, 509
See application file for complete search history.

(56) References Cited

U.S. PATENT DOCUMENTS

| | | | | |
|---|---|---|---|---|
| 5,787,080 | A * | 7/1998 | Hulyalkar | .......... H04Q 11/0478 370/310.2 |
| 10,986,622 | B2 * | 4/2021 | Zhang | .................... H04B 7/088 |
| 2018/0213407 | A1 * | 7/2018 | Miao | .................... H04W 16/14 |

* cited by examiner

*Primary Examiner* — John J Lee
(74) *Attorney, Agent, or Firm* — Muncy, Geissler, Olds & Lowe, P.C.

(57) ABSTRACT

A communication system includes a base station. The base station includes a plurality of distributed units (DUs), a central unit (CU) and a main processor. The main processor selects a mode corresponding to user equipment from a centralized control mode (CM) and a distributed control mode (DM) according to the current communication quality of the user equipment, wherein a functional split mode (FSM) includes the centralized control mode (CM) and the distributed control mode (DM).

11 Claims, 6 Drawing Sheets

COMMUNICATION SYSTEM, METHOD AND COMPUTER PROGRAM PRODUCT THEREFOR

BACKGROUND

1. Field of the Disclosure

The present disclosure relates to the technical field of communication and, more particularly, to the technical field of channel coordination between base stations and user equipment.

2. Description of Related Art

The 5th generation mobile networks (5G) communication technology is provided with diversified communication service types, such as eMBB, uRLLC and other communication services. Therefore, 5G communication not only provides high transmission capacity to satisfy the user experience, but also has to satisfy these communication services as much as possible under the circumstance with limited resources. However, there is still a lack of flexible and efficient functional split technology under the mobile network architecture with hybrid communication services on the market and, under the deployment of the central units (CUs) and distributed units (DUs) of 5G base stations, it is difficult for the processor to perform resource sharing and adjust parameters based on services. In addition, there is also an unresolved problem in how to quickly provide joint transmission services for various communication channels with limited resources.

In view of this, the present disclosure provides an improved communication system, method and computer program product to solve the aforementioned problems.

SUMMARY

Other objects, advantages, and novel features of the disclosure will become more apparent from the following detailed description when taken in conjunction with the accompanying drawings.

Based on the aforementioned purpose, the present disclosure provides a communication system, which comprises: a base station supporting a plurality of communication service types, wherein the base station includes: a plurality of distributed units for connecting with a plurality of user equipment; and a central unit connected with the distributed units; a main processor executing a control mode selection procedure to select a functional split mode corresponding to a user equipment according to current communication quality requirement of the user equipment, wherein the functional split mode includes a centralized control mode and a distributed control mode. In the centralized control mode, the central unit allocates one or more distributed units corresponding to the user equipment and the central unit is responsible for communication scheduling of the user equipment and, in the distributed control mode, a distributed unit currently corresponding to the user equipment is responsible for communication scheduling of the user equipment.

In addition, the present disclosure provides a communication method executed in a communication system comprising a base station supporting a plurality of communication service types and including a plurality of distributed units for connecting with a plurality of user equipment, a central unit connected with the distributed units, and a main processor. The communication method comprises the steps of: using the main processor to execute a control mode selection procedure to select a functional split mode corresponding to a user equipment according to current communication quality requirement of the user equipment, wherein the functional split mode includes a centralized control mode and a distributed control mode. In the centralized control mode, the central unit allocates one or more distributed units corresponding to the user equipment and the central unit is responsible for communication scheduling of the user equipment. In the distributed control mode, a distributed unit currently corresponding to the user equipment is responsible for communication scheduling of the user equipment.

In addition, the present disclosure provides a computer program product executed by a main processor of a communication system including a base station supporting a plurality of communication service types and including a plurality of distributed units for connecting with a plurality of user equipment, a central unit connected with the distributed units, and a main processor, wherein the computer program product comprises: an instruction causing the main processor to execute a control mode selection procedure to select a functional split mode corresponding to a user equipment according to current communication quality requirement of the user equipment, wherein the functional split mode includes a centralized control mode and a distributed control mode. In the centralized control mode, the central unit allocates one or more distributed units corresponding to the user equipment and the central unit is responsible for communication scheduling of the user equipment. In the distributed control mode, a distributed unit currently corresponding to the user equipment is responsible for communication scheduling of the user equipment.

DETAILED DESCRIPTION

The following embodiments describe the implementation and operation principles of the spatial light modulator disclosed in the present disclosure. Those skilled in the art to which the present disclosure pertains may understand the features and effects of this disclosure through the abovementioned embodiments, and may perform combination, modification, replacement or adaption based on the spirit of the present disclosure.

The term "connected" as used herein refers to aspects such as direct connection or indirect connection, and is not limited thereto. The term "when . . . " herein may denote "during the time that . . . ", "before . . . ", or "after . . . " and is not limited thereto.

The ordinals recited herein such as "first", "second" and so on are intended only to describe the elements claimed and imply or represent neither that the claimed elements have any preceding ordinals, nor that sequence between one claimed element and another claimed element or between steps of a manufacturing method. The use of these ordinals is merely to differentiate one claimed element having a certain designation from another claimed element having the same designation.

When multiple effects (or elements) are described herein, if the term "or" is used between the multiple effects (or elements), it means that the effects (or elements) may exist independently, but it does not exclude that the multiple effects (or elements) may coexist. In other words, as long as the description is reasonable, the term "or" may involve the meaning of "and".

One of the objectives of the present disclosure is to enable a 5G base station (BS) that supports multiple communication service types to automatically adjusts the functional split mode of the central unit (hereinafter abbreviated as CU end) and the distributed unit (hereinafter abbreviated as DU end) corresponding to the user equipment (hereinafter abbreviated as UE end) when processing data transmission on a downlink channel according to the user equipment within the service range.

Figure 1:
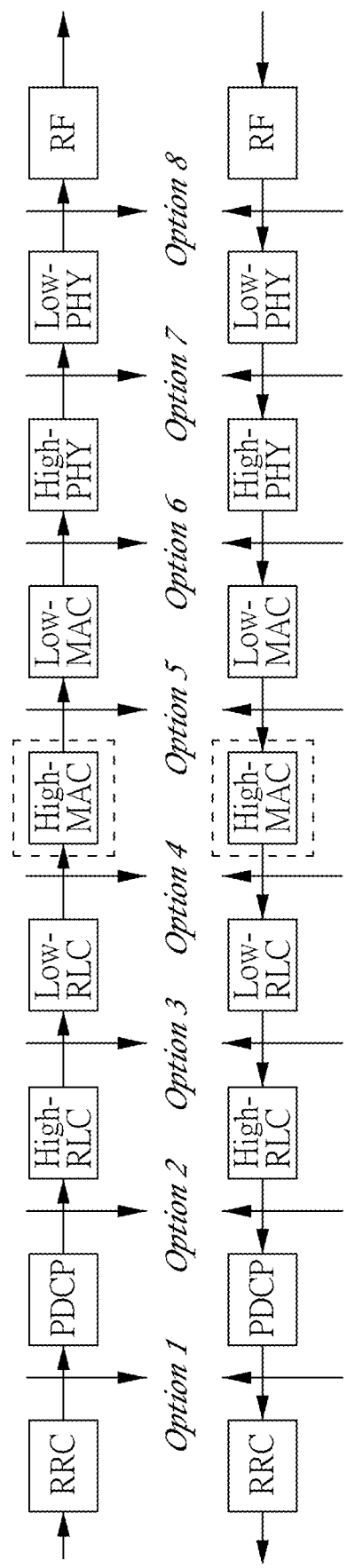
FIG. 1 is a schematic diagram of a functional split of central unit and distributed unit with 5G communication technology according to an embodiment of the present disclosure.

FIG. 1 is a schematic diagram of the functional split of the CU end and the DU end with 5G communication technology according to an embodiment of the present disclosure. As shown in FIG. 1, the 5G communication architecture can be divided into nine protocol layers, namely radio resource control (RRC), classification data convergence protocol (PDCP), high radio link control (High RLC), and low radio link control (Low RLC), high media access control (High MAC), low media access control (Low MAC), high physical layer (High PHY), low physical layer (Low PHY), and radio frequency (RF). The central unit and the distributed unit may have different functional splits between these protocol layers, for example, taking a certain protocol layer as the boundary between the CU end and the DU end. In the functional split mode of the present disclosure, the High MAC is used as the split boundary.

The functional split mode of the present disclosure includes a centralized control mode (hereinafter abbreviated as CM mode) and a distributed control mode (hereinafter abbreviated as DM mode). In the CM mode, the High-MAC layer is placed on the CU end and, in the DM mode, the High-MAC layer is placed on the DU end, wherein the High-MAC layer is primarily provided for communication scheduling and interference coordination. As a result, in the CM mode, the CU end is responsible for handling the scheduling and interference coordination between the UE end and the base station. The CU end has channel state information (CSI) of global knowledge and is capable of assigning one or more DU ends corresponding (connected) to each UE end, and the CU end is responsible for the communication scheduling of the UE end. On the contrary, in the DM mode, the DU end currently corresponding to the UE end is responsible for the communication scheduling of the UE end.

Next, the architecture of the communication system of the present disclosure will be explained.

Figure 2:
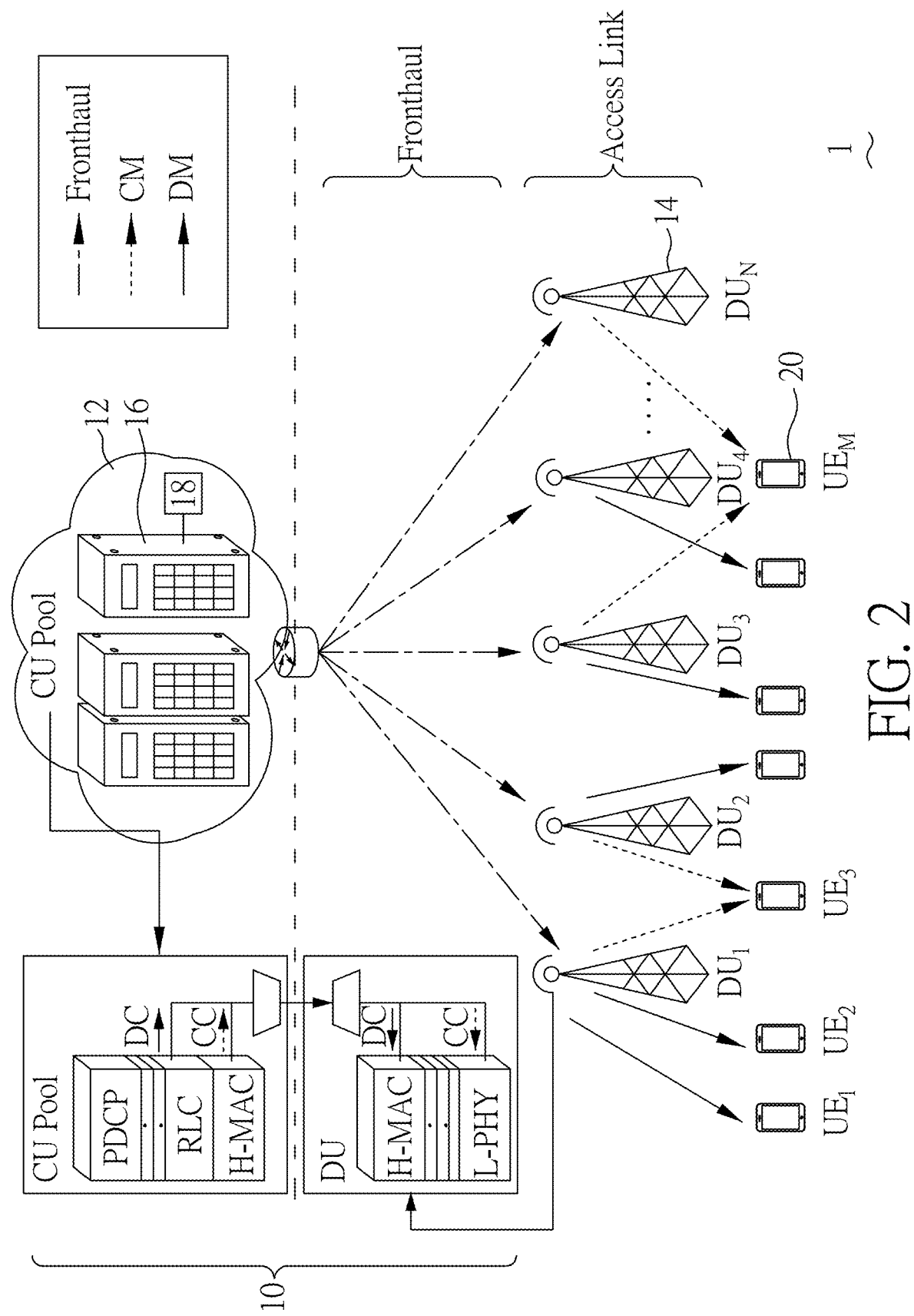
FIG. 2 is a system architecture diagram of a communication system according to an embodiment of the present disclosure.

FIG. 2 is a system architecture diagram of the communication system 1 according to an embodiment of the present disclosure. The communication system 1 of the present disclosure includes a base station 10. The base station 10 can provide a service range that supports multiple 5G communication service types, so that multiple UE ends 20 within the service range can use these communication service types, wherein the communication service types include eMBB service and uRLLC service, and is not limited thereto. In addition, the base station 10 may include a CU end 12, a plurality of DU ends 14 and at least one main processor 16. For the convenience of description, it is assumed that the base station 10 includes one CU end 12 (for example, CU1) and N DU ends 14 (for example, DU1~DU(N)), and there are M UE end 20 (for example, UE1~UE(M)) where M and N are each a positive integer greater than 1. In addition, the CU end 12 and the DU ends 14 may share the main processor 16, or the DU ends 14 may each have a processor (hereinafter referred to as a sub-processor).

The CU end 12 (for example, CU1) can be connected to the DU end 14 (for example, DU1~DU(N)), wherein the "connected" can be, for example, wired transmission or wireless transmission. In the case of wireless transmission, the CU end 12 The DU end 14 can be disposed in different locations. In addition, the CU end 12 may include one or more servers, and the main processor 16 may be disposed in these servers, but it is not limited thereto.

The DU end 14 (for example, DU1~DU(M)) can have a communication connection (that is, establish a communication channel) with the UE end 20 (for example, UE1~UE(M)), and one DU end 14 can be connected with multiple UE ends 20 to provide services. In addition, one UE end 20 can also be connected to multiple DU ends 14 at the same time, which is implemented by, for example, using a coordinated multipoint (CoMP) joint transmission technology.

In addition, the main processor 16 can execute a computer program product 18. The computer program product 18 includes a plurality of instructions, and the main processor 16 can execute various operations of the present disclosure according to the instructions. In one embodiment, the main processor 16 can execute a control mode selection procedure by the instructions of the computer program product 18, so as to select the functional split mode (CM mode or DM mode) suitable for the UE end 20 according to the current communication quality requirements of the UE end 20. In addition, the main processor 16 can be arranged in the CU end 12, but can also be arranged outside the CU end 12 and connected to the CU end 12. In one embodiment, the main processor 16 can also be replaced by a sub-processor of the DU end 14, or the data can be directly processed by a cloud processor, and it is not limited thereto.

In one embodiment, the control mode selection procedure includes the step: the main processor 16 compares a power level difference (PLD) average value $$\overline{g_{C_k(1),k}}_{(g_{C_k(2),k})}$$

of a UE end 20 with a power level difference threshold ($\gamma_{n_s}$) of the DU end 14 currently corresponding to the UE end 20

(that is, the DU end 14 currently serving the UE end 20) and, when the power level difference average value $$\frac{gc_{k(1),k}}{(gc_{k(2),k})}$$

is less than or equal to the power level difference threshold ($\gamma_{n,s}$), the main processor 16 executes the CM mode, otherwise, executes the DM mode.

The power level difference (PLD) is defined as the ratio of the power received by the UE end 20 from the closet DU end 14 to the power received by the UE end 20 from the second closest DU end 14. The power level difference threshold ($\gamma_{n,s}$) is defined as the power level difference that the DU end 14 has to comply with under a specific communication service type (uRLLC or eMBB), wherein n represents the n-th DU end, and n is a positive integer. The parameter $g_{j,k}$ of the power level difference average value $$\frac{gc_{k(1),k}}{(gc_{k(2),k})}$$

represents the large scale fading between the j-th DU end 14 and the k-th UE end 20, $c_{k(1)}$ represents the number of the DU end 14 that provides the largest power source received by the k-th UE end 20, and $c_{k(2)}$ represents the number of the DU end 14 that provides the second largest power source received by the k-th UE end 20.

In view of this, when the power level difference average value $$\frac{gc_{k(1),k}}{(gc_{k(2),k})}$$

of the UE end 20 is smaller than or equal to the power level difference threshold ($\gamma_{n,s}$) of the corresponding DU end 14 at present, it can be seen that the power of the DU end 14 which is second closest to the UE end 20 is regarded as noise and will threaten the communication quality of the UE end 20 to a certain extent. Therefore, the UE 20 must be changed to a joint transmission technology, and the main processor 16 will allocate the transmission of the UE end 20 to use the CM mode.

In addition, in one embodiment, the CU end 12 and each DU end 14 can be connected through a fronthaul. In one embodiment, there is no communication function between the DU ends 14, so that the DU ends 14 perform communication through the CU end 12.

In one embodiment, the distributed configuration among the DU end 14, the UE end 20 using eMBB service, and the UE end 20 using uRLLC service is based on a two-dimensional Poisson point process (hereinafter abbreviated as PPP configuration).

In one embodiment, the DU end 14 and the CU end 12 adopt a processor sharing model architecture (hereinafter abbreviated as PS architecture), wherein the PS architecture is characterized by: when a processor receives a packet, regardless of the size and complexity of the packet, the processor will evenly allocate computing resources to the packet and other packets being processed. In addition, since the PS architecture supports multiple communication service types, it is suitable for the communication system 1 of the present disclosure.

Since the present disclosure relates to the functional split mode of the CU end 12 and the DU end 14, and the effect of the functional split mode depends on SINR and end to end delay (E2E delay) probability, the automatic control mode selection procedure performed by the communication system 1 must meet two conditions: (1) allowing the operation of the communication system 1 to have the minimum point-to-point delay probability; (2) ensuring that SINR of each UE end 20 meets the requirement of specific communication service used by the UE end 20.

In one embodiment, the two conditions that must be met by the automatic control mode selection procedure can be represented by a first conditional expression and a second conditional expression, wherein the first conditional expression can be regarded as the minimum occurrence probability of end to end delay (which can also be regarded as the minimum delay outage probability (DOP)), and the second conditional expression can be regarded as the requirement of the SINR average value, which as illustrated as follows:

$$\min_{p} Pr\{t_{E_n,u} > t_{req,u}\}, \forall n, \quad \text{(the first conditional expression)}$$

$$\text{s.t. } E\{\Gamma_s(r)\} \geq \Gamma_{req,s}, \forall s, \quad \text{(the second conditional expression)}$$

where p is defined as a matrix composed of $p_{n,m,s}$ (this parameter will be described in the following paragraphs) of each DU end 14 in the communication system 1, and $r_{req,s}$ is the SINR average value required by the service S (uRLLC or eMBB).

In order to meet the aforementioned two conditions, the present disclosure provides a communication method (automatic control mode selection procedure) for the communication system 1.

Figure 3:
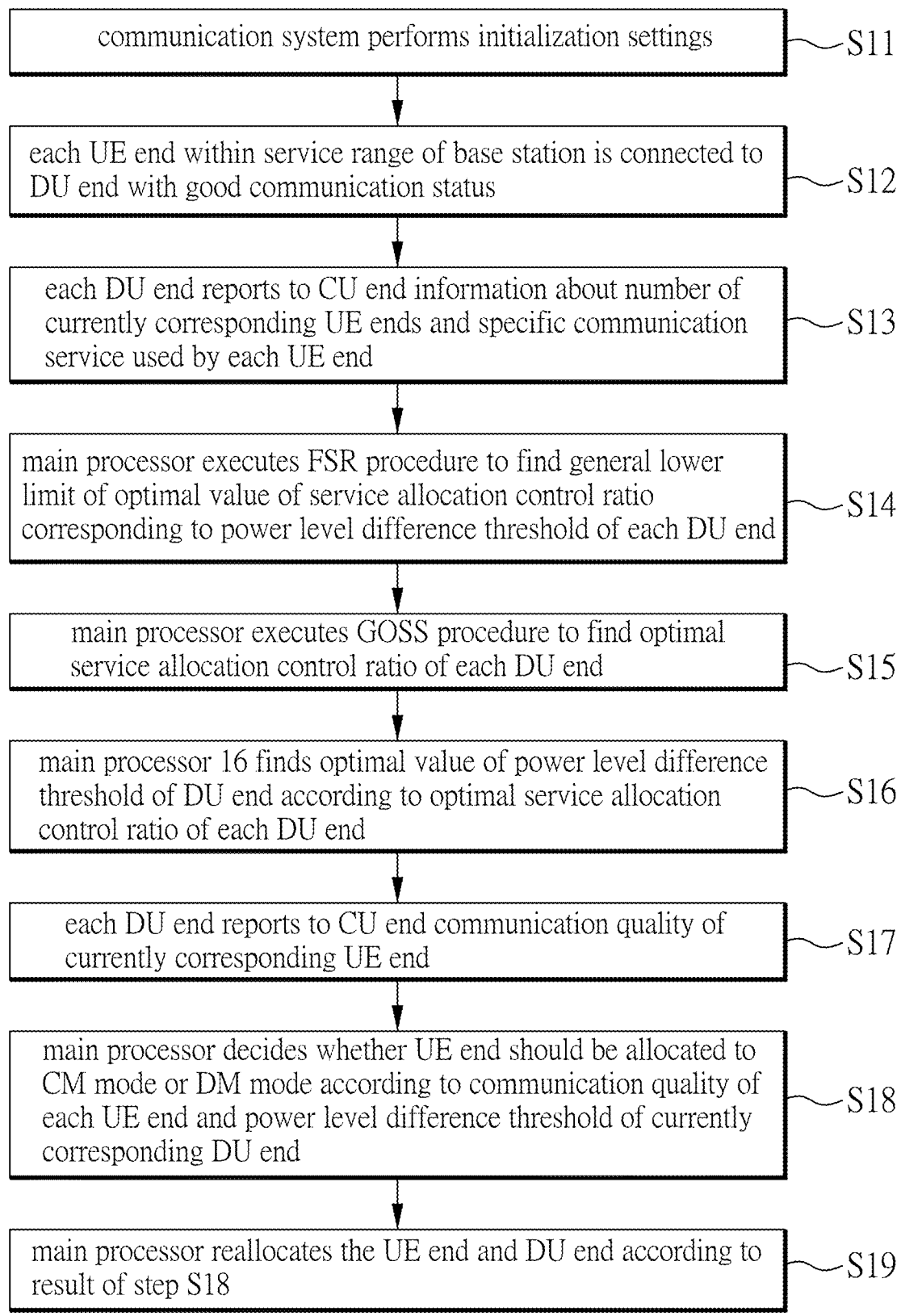
FIG. 3 is a main flowchart of a communication method according to an embodiment of the present disclosure.

FIG. 3 is a main flowchart of a communication method according to an embodiment of the present disclosure. With reference to FIGS. 1, 2 and 3 at the same time, FIG. 3 can be used to show the details of the automatic control mode selection procedure.

As shown in FIG. 3, at first, step S11 is executed to perform initialization settings on the communication system 1. In this step, the communication system 1 will preset the SINR ($\Gamma_{req,s}$) required by the various types of communication services supported thereby and the distribution density of each DU end 14 (defined as $\lambda_D$). In one embodiment, $\Gamma_{req,s}$ and $\lambda_D$ can be inputted into the main processor 16 by the system administrator, but it is not limited thereto.

Then, step S12 is executed, in which each UE end 20 within the service range of the base station 10 is connected to the DU end 14 with good communication status, so that the main processor 16 is aware of the transmission quality of each EU end 20. In one embodiment, the "good communication status" can be, for example, high signal strength, no congestion, or low noise at present, and is not limited to this. In addition, since the distance between each UE end 20 and each DU end 14 is different, for different UE ends 20, the DU end 14 with good communication status may be different.

Then, step S13 is executed, in which each DU end 14 reports to the CU end 12 information about the number of currently corresponding (currently serving) UE ends 20 and the proportion of UE ends 20 using the specific communication service (such as uRLLC or eMBB). For example, the main processor 16 may be aware of "DU1 currently corresponding to UE1 to UE4", "UE1, UE3 and UE4 using uRLLC services", "UE2 using eMBB services", and "the ratio of uRLLC services to eMBB services is 3:1" and other information.

Then, the main processor 16 starts to search for the optimal value of the power level difference threshold ($\gamma_{n,s}$) of each DU end 14. As can be seen from the foregoing paragraphs, the magnitude relationship between the power level difference average value $$\frac{gc_k(1),k}{(gc_k(2),k)}$$

of the UE end 20 and the power level difference threshold ($\gamma_{n,s}$) of the corresponding DU end 14 will determine whether the UE end 20 is allocated to the CM mode or the DM mode. Therefore, how to determine the optimal value of the power level difference threshold ($\gamma_{n,s}$) of each DU end 14 will be one of the key points of the present disclosure. The main processor 16 searching for the optimal value of the power level difference threshold ($\gamma_{n,s}$) of the DU 14 may include steps S14 to S16.

In Step S14, the main processor 16 executes a feasible set reduction (FSR) procedure to find a general lower limit ($p_{L,s}$) of the optimal value of a service allocation control ratio ($p_{n,CM,s}$) corresponding to the power level difference threshold ($\gamma_{n,s}$) of each DU end 14. The service allocation control ratio ($p_{n,CM,s}$) can be defined as a proportion of one or more UE ends 20 corresponding to the n-th DU end 14 and using the CM mode under a specific communication service type S.

Figure 4:
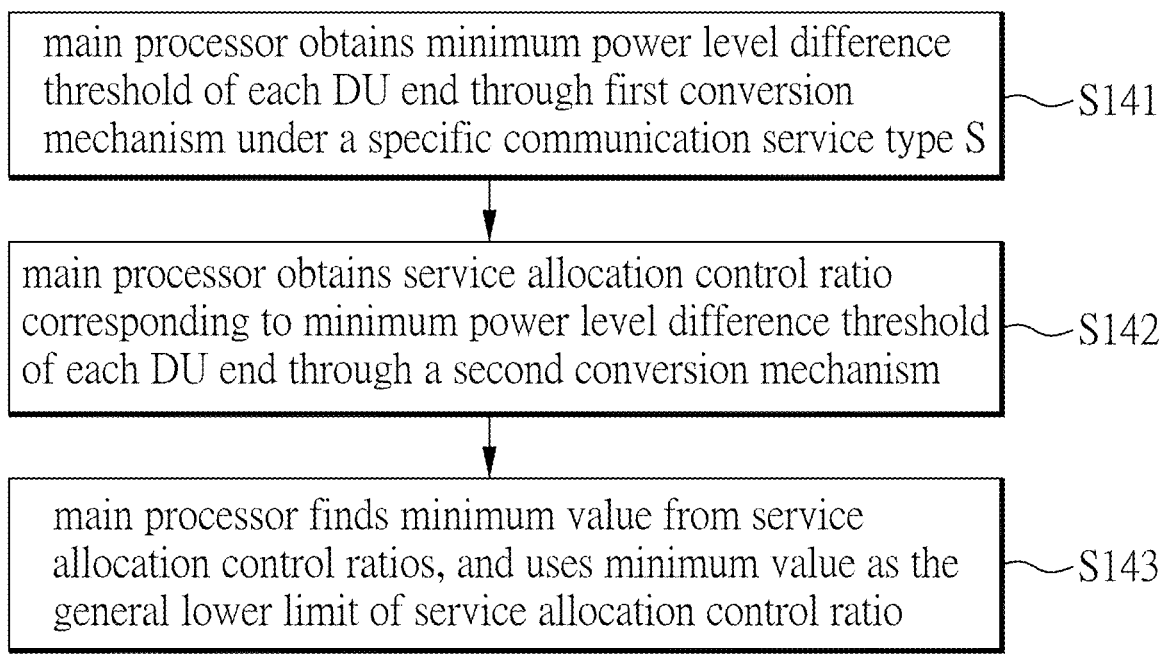
FIG. 4 is a detailed flowchart of the feasible set reduction (FSR) procedure (step S14) according to an embodiment of the present disclosure.

Herein, the details of step S14 will be described first. Please refer to FIGS. 1 to 4 at the same time. FIG. 4 is a detailed flowchart of a feasible set reduction procedure according to an embodiment of the present disclosure.

As shown in FIG. 4, step S141 is executed at first, in which the main processor 16 obtains a minimum power level difference threshold ($\gamma_{L,s}$) of each DU end 14 through a first conversion mechanism under a specific communication service type S. The first conversion mechanism is correlated to the conversion between the SINR and $\gamma_{n,s}$ that the UE end 20 must comply with under the specific communication service type S.

In step S141, since the main processor 16 has obtained the SINR required by various communication service types S in step S11, the main processor 16 can directly obtain $\Gamma_{req,s}$.

In one embodiment, the first conversion mechanism can be presented through the first formula as follows:

$$E\{\Gamma_s(r)\} = \int_{r=0}^{\infty} \Gamma_s(r) \cdot b(r,1) dr \quad \text{(first formula)},$$

where $E\{\Gamma_s(r)\}$ is defined as the SINR average value of the UE end 20 using the specific communication service s, which can also be substituted directly by $\Gamma_{req,s}$, $\Gamma_s(r)$ is defined as the SINR of the UE end 20 when the distance between the UE 20 using the specific communication service s and the closest DU end 14 is r, and b(r,1) is defined as the probability that the distance between the UE end 20 using the specific communication service s and the closest DU end 14 is r in the PPP distribution.

Furthermore, in one embodiment, $\Gamma_s(r)$ can be presented through a second formula as follows:

$$\Gamma_s(r) = \frac{P \cdot r^{-\alpha} + \overline{P}(r, A(\gamma_{n,s})r)}{\sigma^2 + \overline{P}(A(\gamma_{n,s})r, \infty)}, \quad \text{(second formula)}$$

where $P \cdot r^{-\alpha}$ is defined as the signal power of the n-th DU end 14, $\overline{P}(r, A(\gamma_{n,s})r)$ and $\overline{P}(A(\gamma_{n,s})r, \infty)$ is defined as the signal power of other DU ends 14 (which is referred to as interference here), and $\sigma^2$ is defined as the noise power.

According to the second conditional expression, the minimum requirement of $E\{\Gamma_s(r)\}$ is $\Gamma_{req,s}$, and thus the main processor 16 can obtain the minimum power level difference threshold ($\gamma_{L,s}$) satisfying the second conditional expression for each DU end 14 through the inverse function of the first formula (for example, through interpolation).

Then, step S142 is executed, the main processor 16 obtains a service allocation control ratio ($p_{n,CM,s}$) corresponding to the minimum power level difference threshold ($\gamma_{L,s}$) of each DU end 14 through a second conversion mechanism, wherein the second conversion mechanism is correlated to the conversion between the service allocation control ratio ($p_{n,CM,s}$) and the power level difference threshold ($\gamma_{n,s}$).

In one embodiment, the second conversion mechanism can be presented through a third formula as follows:

$$p_{n,CM,s} = \int_{r_1=0}^{\infty} \int_{r_2=r_1}^{A(\gamma_{n,s})r_1} b_{joint}(r_1, r_2) dr_2 dr_1 \quad \text{(third formula)},$$

where $r_1$ is defined as the distance between the UE end 20 currently corresponding to the n-th DU end 14 and the closest DU end 14, and $r_2$ is defined as the distance between UE end 20 currently corresponding to the n-th DU end 14 and the next closest DU end 14. In addition, $b_{joint}(r_1,r_2) = (2\pi\lambda_D)^2 r_1 r_2 e^{-\pi\lambda_D r_2^2}$ and $b_{joint}(r_1,r_2)$ can be used to define the joint probability of two cases, wherein case one is: the DU end 14 currently corresponding to the UE end 20 is the closest DU end 14, and case two is: the DU end 14 currently corresponding to the UE end 20 is the next closest DU end 14.

Since the main processor 16 has obtained the minimum power level difference threshold ($\gamma_{L,s}$) of each DU end 14, the main processor 16 can take $\gamma_{L,s}$ of the DU end 14 as $\gamma_{n,s}$ and apply it into the third formula so as to obtain $p_{n,CM,s}$ converted from $\gamma_{L,s}$, wherein the $p_{n,CM,s}$ corresponding to each DU end 14 may be different.

Then, step S143 is executed, in which the main processor 16 finds a minimum value from those $p_{n,CM,s}$, and uses the minimum value as the general lower limit ($p_{L,s}$). In this way, the feasible set reduction procedure can be completed.

Please refer to FIG. 3 again. After step S14 is completed, step S15 is executed, in which the main processor 16 executes a globally optimal solution search (GOSS) procedure to find an optimal service allocation control ratio (P*) of each DU end 14. In other words, the purpose of step S15 is to find the optimal service allocation control ratio (P*) of each DU end 14 when the general lower limit ($p_{L,s}$) of the optimal service allocation control ratio (P*) of the DU end 14 is known.

Figure 5:
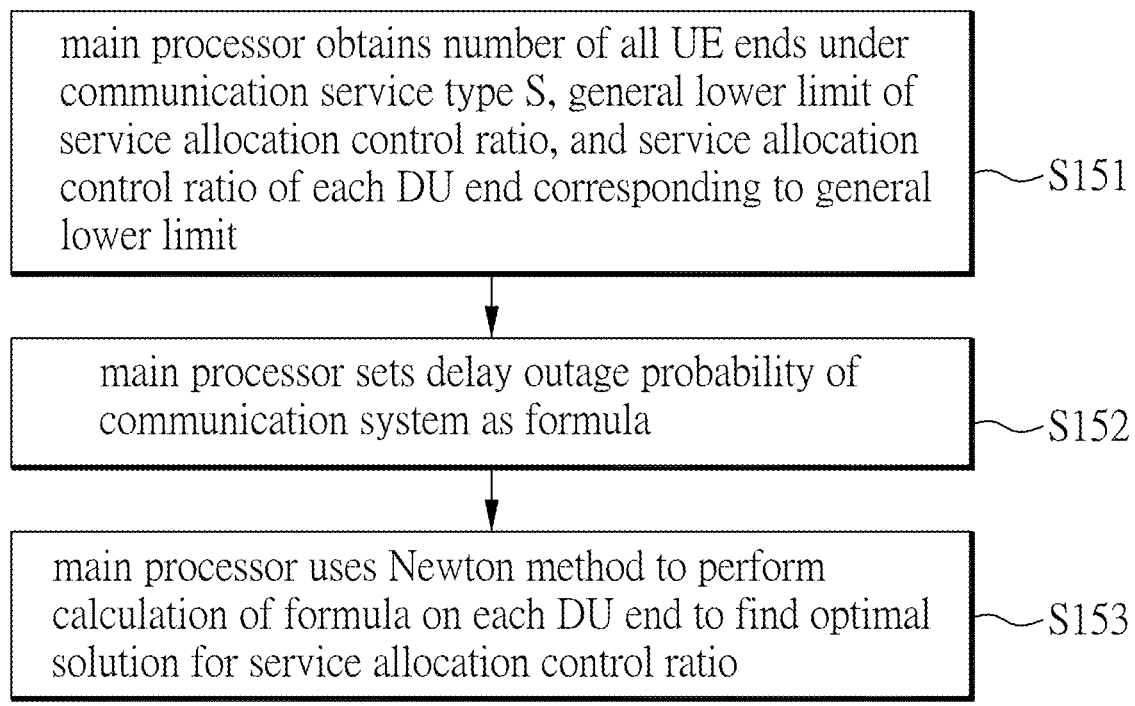
FIG. 5 is a detailed flowchart of the globally optimal solution search (GOSS) procedure (step S15) according to an embodiment of the present disclosure.

Herein, the details of step S15 will be described first. Please refer to FIGS. 1 to 5 at the same time. FIG. 5 is a detailed flowchart of the globally optimal solution search procedure according to an embodiment of the present disclosure As shown in FIG. 5, step S151 is executed at first, in which the main processor 16 obtains the number of all UE ends 20 using the communication service type S, the general lower limit $p_{L,s}$, and the service allocation control ratio $p_{n,CM,s}$ of each DU end 14 that corresponds to the general lower limit $p_{L,s}$.

Then, step S152 is executed, in which the main processor 16 sets the delay outage probability $\Pr\{t_{E_n,u} \geq t_{req,u}\}$ of the communication system 1 as the formula $f_n(p)$.

Then, step S153 is executed, in which the main processor 16 uses Newton method to perform calculation of $f_n(p)$, $f'_n(p)$ and $H(f_n(p))$ on each DU end 14 to find the optimal service allocation control ratio (P*), where $f'_n(p)$ is defined as the first derivative of $f_n(p)$, and $H(f_n(p))$ is defined as the second derivative of $f_n(p)$.

In one embodiment, step S153 can be divided into:
(1) calculating $\Delta p = -H(f_n(p))^{-1} f'_n(p)$
(2) calculate step difference $\Delta = |f_n(p+\Delta p) - f_n(p)|$
(3) calculating $p = p + \Delta p$
(4) repeating (1)~(3) until the step difference is smaller than a threshold or the number of iterations has reached an upper limit.

As a result, the globally optimal solution search procedure can be completed, and the main processor 16 can find the optimal service allocation control ratio (P*) of each DU2 end 14.

Please refer to FIG. 3 again. Following step S15, step S16 is executed, in which the main processor 16 finds the optimal value of the power level difference threshold ($\gamma_{n,s}$) of the DU end 14 according to the optimal service allocation control ratio (P*) of each DU end 14.

In one embodiment, the main processor 16 applies the optimal service allocation control ratio (P*) of each DU end 14 into the second formula, and performs back-calculation to obtain a power level difference threshold ($\gamma_{n,s}$). At this moment, the power level difference threshold ($\gamma_{n,s}$) is the optimal value. In this way, the main processor 16 can find the optimal value of the power level difference threshold ($\gamma_{n,s}$) of each DU end 14.

Then, the main processor 16 executes steps S17 and S18. In Step S17, each DU end 14 reports to the CU end 12 the communication quality of the currently corresponding (currently serving) UE end 20, so that the main processor 16 obtains the SINR average value $$\frac{g_{C_k(1),k}}{(g_{C_k(2),k})}$$

of each UE end 20.

In Step S18, the main processor 16 compares the SINR average value $$\frac{g_{C_k(1),k}}{(g_{C_k(2),k})}$$

of each UE 20 with the optimal value of the power level difference threshold ($\gamma_{n,s}$) of the currently corresponding DU end 14 and, according to the control mode decision mechanism, decides whether the UE end 20 should be allocated to the CM mode or the DM mode.

Then, step S19 is executed, in which the main processor 16 reallocates the UE end 20 and the DU end 14 according to the result of step S18. In this way, the automatic control mode selection procedure can be completed, and the operation of the communication system 1 can meet the first conditional expression and the second conditional expression.

Figure 6:
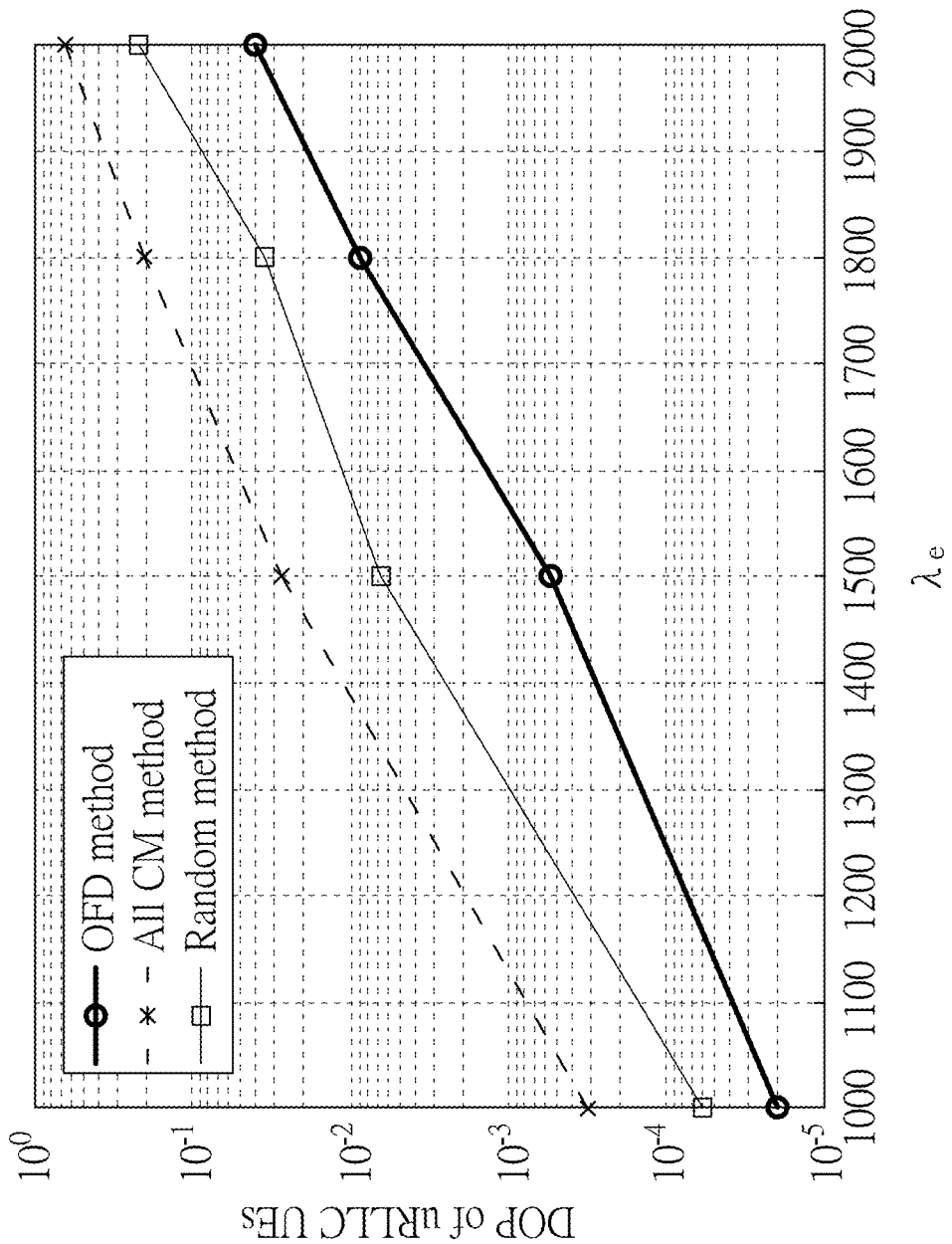
FIG. 6 is an effect comparison simulation diagram of the communication method according to an embodiment of the present disclosure versus other control modes.

FIG. 6 is an effect comparison simulation diagram of the communication method according to an embodiment of the present disclosure versus other control modes. The first comparative example is a control mode in which all UE ends 20 are allocated to the CM mode, and the control mode in the second comparative example is to randomly allocate the functional split mode corresponding to the UE 20. In addition, the horizontal axis in FIG. 6 represents the density of eMbb, and the vertical axis represents the current delay in uRLLC.

As shown in FIG. 6, the communication method of the present disclosure has the least delay outage, and therefore can provide better communication quality. In view of this, the communication method of the present disclosure can surely improve the communication quality.

Next, in order to make the description of the present disclosure clearer, the derivation process of each formula will be described below.

[Functional Split and Signal-to-Noise Ratio]

In the communication system of the present disclosure, if a UE end 20 (for example, UE(k), where k is a positive integer) does not use joint transmission, its SINR at a specific time point t is:

$$SINR = \frac{P g_{C_k(1),k} h_{C_k(1),k}(t)}{\sigma^2 + \sum_{j \neq C_k(1)} P g_{j,k} h_{j,k}(t)}, \quad \text{(equation 1)}$$

wherein Ck(j) is defined as the power received by EU(k) from each DU end 14 in descending order (for example, DU1, DU2, ..., DU(N)), where j=1~N, P is defined as the transmission power of the DU end, $\sigma^2$ is defined as the noise power, $g_{j,k} = d_{j,k}^{-\alpha}$ is defined as the large scale fading between DU(j) and UE(k), $h_{j,k}(t)$ is defined as the small scale fading between DU(j) and UE(k) at time t, d is defined as the distance between DU(j) and UE(k), and $\alpha$ is defined as the path loss exponent.

In addition, the power level difference (PLD) of UE(k) is defined as the ratio of the maximum received power to the second-to-maximum received power, which can be expressed as:

$$PLD = \frac{P g_{C_k(1),k} h_{C_k(1),k}(t)}{P g_{C_k(2),k} h_{C_k(2),k}(t)}. \quad \text{(equation 2)}$$

Over a long period of time, the small-scale fading may have no effect. Therefore, assuming that the average value of small-scale fading is 1, the power level difference average value of UE(k) can be regarded as a function only related to large-scale fading. Therefore, it can be expressed as:

$$\frac{g_{C_k(1),k}}{g_{C_k(2),k}}. \quad \text{(equation 3)}$$

Furthermore, the SINR($\Gamma_{k,s}$) of the UE(k) using the service s can be expressed as:

$$\Gamma_{k,s} = \begin{cases} \dfrac{\sum_{j=\{C_k(1),C_k(2)\}} P g_{j,k}}{\sigma^2 + \sum_{j \neq C_k(1),C_k(2)} P g_{j,k}}, & \text{if } \dfrac{g_{C_k(1),k}}{(g_{C_k(2),k})} \leq \gamma_{n,s} \\ \dfrac{P g_{C_k(1),k}}{\sigma^2 + \sum_{j \neq C_k(1)} P g_{j,k}}, & \text{otherwise} \end{cases}, \quad \text{(equation 4)}$$

wherein $\Gamma_{k,s}$ is defined as the SINR average value of UE(k) using the service S, and $\gamma_{n,s}$ is defined as the power level difference threshold required by the service S in the service range of DU(k).

With equation 4, when $$\frac{g_{C_k(1),k}}{g_{C_k(2),k}}$$

is smaller than or equal to $\gamma_{n,s}$, the processor 16 will allocate UE(k) to the CM mode, otherwise, allocate UE(k) to the DM mode.

[End to End Delay (E2E Delay)]

The technical consideration of the present disclosure is the architecture of functional split. Therefore, for a packet of service S in the functional split mode m, the end to end delay ($t_{E_n,m,s}$) that occurs through DU(n) transmission may include: the detention time ($t_{C_o,m,s}$) of the packet at the CU end 12, the transmission time ($t_{F_n,m,s}$) of the packet in the fronthaul, and the detention time ($t_{D_n,m,s}$) of the packet at the DU end 14. Therefore, the end to end delay ($t_{E_n,m,s}$) can be regarded as the time duration from the packet arriving the CU end 12 to the packet being successfully accepted by the UE end 20, and thus can be expressed as:

$$t_{E_n,m,s} = t_{C_o,m,s} + t_{F_n,m,s} + t_{D_n,m,s} \quad \text{(equation 5)},$$

wherein $$t_{F_n,m,s} = \frac{\xi_m F_s}{R_{F_n}},$$

represents the transmission rate of the fronthaul between the CU end 12 and the DU end 14, $F_s$ represents the original packet size, and $\xi_m$ is the magnification rate of the packet in the functional split mode m.

Next, the detention time of the packet at the CU end 12 and the DU end 14 is further discussed as follows.

In one embodiment, since the processor in the present disclosure adopts the PS architecture, the processor 16 will evenly allocate computing resources to all packets (regardless of the size of the packets). In one example, if the processor 16 is denoted as processor X and its computing power is Sx (CPU circles/Slot), and when a packet arrives and the processor X is processing q packets, this packet will be given Sx/(q+1) computing resources. Therefore, the detention time when a packet using service S arrives at processor X that is processing q packets can be expressed as:

$$\frac{w_{X,m,s}(q+1)}{S_X}, \quad \text{(equation 6)}$$

where $W_{X,m,s}$ is defined as the processing capacity of processor X in the case of service S and functional split mode m.

Next, the work loading of processor X (that is, the proportion of packets received and processed by processor X within a period of time) is further discussed. The work loading of processor X relates to the number of UEs served thereby, the arrival rate of packets of service S and the amount of work, and thus it can be expressed as:

$$\rho_{X_i} = \begin{cases} \dfrac{\sum_n \sum_s \sum_m K_{n,s} \mu_s p_{n,m,s} w_{X,m,s}}{S_X}, & \text{when } X = C \\ \dfrac{\sum_s \sum_m K_{i,s} \mu_s p_{i,m,s} w_{X,m,s}}{S_X}, & \text{when } X = D \end{cases} \quad \text{(equation 7)}$$

wherein $\rho_{X_i}$ is defined as the work loading, i is defined as the number of the i-th DU, $K_{n,s}$ is defined as the number of UEs using service S in the service range of DU(n), $\mu_s$ is defined as the arrival rate of packets using service S, $p_{n,m,s}$ is defined as the ratio of UE using the service S allocated by DU(n) to the functional split mode in (known as functional split mode allocation ratio, FAR), FAR satisfies the equation $\Sigma_m p_{n,m,s}=1$, C is defined as the CU end, and D is defined as the DU end.

In addition, the probability characteristic of the PS architecture can be expressed as:

$$Pr\{t_{X_i,m,s} > \tau_{X,m,s}(q)\} \approx Pr\{Q_{X_i} > q\} = \rho_{X_i}^q \quad \text{(equation 8) and}$$

$$Pr\{t_{X_i,m,s} > \tau_{X,m,s}(q)\} \approx Pr\{Q_{X_i} > q\} = \rho_{X_i}^q(1-\rho_{X_i}) \quad \text{(equation 9)},$$

wherein $t_{X_i,m,s}$ is defined as the detention time of the packet using service S in the functional split mode m in the processor X, $\tau_{X,m,s}(q)$ is defined as the detention time of the packet using service S arriving at the processor X which is processing q packets (that is, equation 6), $Q_{X_i}$ represents the number of packets being processed by processor Xi, and Xi is defined as the number of the i-th processor X.

[Delay Outage Probability]

Assuming that the end to end delay of a packet of service S delivered by DU(n) is defined as $t_{E_n,s}$, it has $t_{E_n,m,s}=t_{E_n,s}|m$, and assuming that the requirement of service S to the end to end delay is expressed in terms of $t_{req,s}$(ms), the end to end delay of the packet of service S delivered by DU(n) in the functional split mode in can be expressed as:

$$\begin{aligned} Pr\{t_{E_n,s} > t_{req,s} \mid m\} &= Pr\{t_{E_n,m,s} > t_{req,s}\} \quad \text{(equation 10)} \\ &= Pr\{t_{C_0,m,s} + t_{D_n,m,s} > t_{req,s} - t_{F_n,m,s} - \tau_{CO,m}\} \\ &= 1 - Pr\{t_{C_0,m,s} + t_{D_n,m,s} \leq t'\} \\ &= 1 - \int_{\tau_C=0}^{t'} Pr\{t_{C_0,m,s} = \tau_C\} \\ &\quad \int_{\tau_D=0}^{t'-\tau_C} Pr\{t_{D_n,m,s} = \tau_D\} d\tau_D \tau_C, \end{aligned}$$

wherein and $t'=t_{req,s}-t_{F_n,m,s}-\tau_{CO,m}$ and $\tau_{CO,m}$ is the control delay in the functional split mode m.

From equation 10, it can be seen that the delay outage probability relates to the detention time of the packet at the CU end 12 and the DU end 14, and the detention time relates to the number of packets being processed ($Q_{X_i}$) by the processor 16 (for example, the CU end 12 and the DU end 14 are each connected to one processor), so that equation 10 can be derived as:

$$1 - \sum_{q_C=0}^{Z_{C,m,s}} Pr\{Q_{C_0} = q_C\} \sum_{q_D=0}^{Z_{0,m,s}(q_C)} Pr\{Q_{D_n} = q_D\} = 1 - \sum_{q_C=0}^{Z_{C,m,s}} Pr\{Q_{C_0} = q_C\}\left(1 - \rho_{D_n}^{Z_{D,m,s}(q_C)}\right) \quad \text{(equation 11)}$$

$$= 1 - \sum_{q_C=0}^{Z_{C,m,s}} \rho_{C_0}^{q_C}(1 - \rho_{C_0})\left(1 - \rho_{D_n}^{Z_{D,m,s}(q_C)}\right),$$

wherein $q_C$ and $q_D$ are the number of packets being processed by the processor 16 when the packets arrive at the CU and DU, respectively, and $Z_{C,m,s}$ and $Z_{D,m,s}(q_C)$ are the maximum values of $q_C$ and $q_D$ respectively.

From equation 11, it can be seen that, when the packet arrives at the CU end 12, the number of packets being processed by the processor 16 is greater than $Z_{C,m,s}$, or when the packet arrives at the DU end 14, the number of packets being processed by the processor 16 is greater than $Z_{D,m,s}(q_C)$, a delay outage will occur. Therefore, in order to avoid delay outage, the detention time of the packet at the CU end 12 and the DU end 14 must be:

$$t_{C_0,m,s} + t_{D_n,m,s} \le t' \quad \text{(equation 12)}.$$

Since the present disclosure adopts the PS architecture, the use of equation 6 and equation 12 can be expressed as:

$$\frac{w_{C,m,s}(q_C+1)}{S_C} + \frac{w_{D,m,s}(q_D+1)}{S_D} \le t'. \quad \text{(equation 13)}$$

By substituting 0 for $q_D$, the maximum detention time of the packet at the CU end 12 can be obtained, and by substituting a known number for $q_C$, the maximum detention time $T_D(q_C)$ of the packet at the DU 14 can be obtained, wherein $T_C$ and $T_D(q_C)$ can be expressed as:

$$\begin{cases} T_C = t' - \dfrac{w_{D,m,s}}{S_D} \\ T_D(q_C) = t' - \dfrac{w_{C,m,s}(q_C+1)}{S_C} \end{cases}. \quad \text{(equation 14)}$$

Through equation 14, $Z_{C,m,s}$ and $Z_{D,m,s}(q_C)$ can be expressed as:

$$\begin{cases} Z_{C,m,s} = \left\lfloor \dfrac{S_C T_C}{w_{C,m,s}} - 1 \right\rfloor \\ Z_{D,m,s}(q_C) = \left\lfloor \dfrac{S_D T_D(q_C)}{w_{D,m,s}} - 1 \right\rfloor = \lfloor v_m(Z_{C,m,s} - q_C) \rfloor \end{cases}, \quad \text{(equation 15)}$$

wherein it has $$v_m = \frac{\eta \cdot \beta_{m,C}}{\beta_{m,D}},$$

$\eta \cdot \beta_{m,C}$ represents the processing efficiency ratio of the processors 16 on the DU end 14 and the CU end 12, and $\beta_{m,D}$ is expressed as the processing capacity allocation ratio.

Then, by applying $Z_{C,m,s}$, $T_C$ and $Z_{D,m,s}(q_C)$ of equation 15 into formula 11 into equation 11, and adding up in a proportional series, the delay outage probability of a packet of service S delivered by DU(n) in the functional split mode m can be expressed as:

$$\rho_{C_0}^{Z_{C,m,s}+1} + \quad \text{(equation 16)}$$

$$(1-\rho_{C_0})\rho_{D_n}^{v_m \cdot Z_{C,m,s}} \frac{1 - (\rho_{C_D}\rho_{D_n}^{-v_m})^{Z_{C,m,s}+1}}{1 - \rho_{C_D}\rho_{D_n}^{-v_m}}.$$

In the case that the functional split mode is not limited, equation 16 can be expressed as:

$$= \sum_m p_{n,m,s} \cdot Pr\{t_{E_n,s} > t_{req,s} \mid m\} \quad \text{(equation 17)}$$

$$= \sum_m p_{n,m,s} \cdot Pr\{t_{E_n,m,s} > t_{req,s}\}.$$

From equation 17, it can be seen that the delay outage probability $Pr\{t_{E_n,s} > t_{req,s}\mid m\}$ can be a convex function. The characteristic of the convex function is a necessary condition for the globally optimal solution search procedure.

[SINR Derivation Under PLD]

Assuming that the DU ends 14 are all PPP distribution and the transmission power of all DU ends 14 is P, the signal power average value of all DU ends 14 received by any UE end 20 within the range of distance $r_l$ to $r_u$ it can be expressed as:

$$\overline{P}(r_l, r_u) = 2\pi\lambda_D P \int_{r=r_l}^{r_u} r^{1-\alpha} dr = \frac{2\pi\lambda_D P}{2-\alpha} r^{2-\alpha} \Big|_{r_l}^{r_u}, \quad \text{(equation 18)}$$

wherein $\lambda_D$ is the distribution density of the DU end 14.

The PPP distribution of the DU 14 is correlated to the size of the PLD, and the SINR is also affected thereby, so that, by using equation 18 to calculate the received power of the UE end 20, it can be known that, when the distance between a UE 20 using service S and the closest DU end 14 is r, the SINR of the UE end 20 can be expressed as:

$$\Gamma_s(r) = \frac{P \cdot r^{-\alpha} + \overline{P}(r, A(\gamma_{n,s})r)}{\sigma^2 + \overline{P}(A(\gamma_{n,s})r, \infty)}, \quad \text{(equation 19, also the second formula)}$$

wherein it has $A(\gamma_{n,s}) = 10^{\gamma_{n,s}/(10\alpha)}$.

As a result, the derivation process of the second formula can be understood.

In addition, if the SINR average value of the UE 20 has to be further obtained, the distance information and statistical characteristics between the DU 14 and the UE 12 must be considered. Therefore, under the PPP distribution of the DU end 14, the probability that the DU end 14 that is j-th farthest from the UE end 20 is located at a distance r can be expressed as:

$$b(r, j) = \frac{2(\pi\lambda_D)^j}{(j-1)!} r^{2j-1} e^{-\pi\lambda_D r^2}. \quad \text{(equation 20)}$$

From equation 20, it can be seen that the SINR average value of the UE using service S is:

$$E\{\Gamma_s(r)\} = \int_{r=0}^{\infty} \Gamma_s \cdot b(r,1) dr \quad \text{(equation 21, that is, the first formula)}.$$

As a result, the derivation process of the first formula can be understood.

[Problem Definition]

The technology of the present disclosure focuses on minimizing the delay outage probability of uRLLC service, while giving consideration to the data transmission rate of uRLLC service and eMBB service, so that the problem definition can be expressed as:

$$\min_{p} Pr \quad \text{(equation 22a, i.e. the first conditional expression)}$$
$$\{t_{E_n,u} > t_{req,u}\},$$
$$\forall n, \text{ and}$$
$$\text{s.t. } E\{\Gamma_s(r)\} \geq \quad \text{(equation 22b, i.e. the second conditional expression)}$$
$$\Gamma_{req,s}, \forall s,.$$

For the communication system 1, adjusting the FAR to meet the problem definition is a reasonable and achievable way. Therefore, the goal of the communication method in FIG. 3 is to find the optimal FAR (that is, by adjusting the FAR to adjust the work loading of each processor 16) so as to minimize the delay outage probability of uRLLC service.

In addition, in the PLD method, since only a large scale fading is considered, the power level difference threshold $\gamma_{n,s}$ will relate to whether the DU ends 14 in a wide range are included in the joint transmission, and thus it will also affect $p_{n,m,s}$ (for example $p_{n,CM,s}$) and SINR average value. In view of this, it can be seen that selecting an appropriate FAR can enable the communication system 1 to meet the conditions of problem definition.

In addition, the relationship of Alms and the power level difference threshold $\gamma_{n,s}$ of a DU end 14 (for example, DU(n)) can be expressed as:

$$p_{n,CM,s} = \int_{r_1=0}^{\infty} \int_{r_2=r_1}^{A(\gamma_{n,s})r_1} b_{joint}$$
$$(r_1, r_2) dr_2 dr_1 \quad \text{(equation 23, i.e. third formula)},$$

wherein $p_{n,CM,s}$ to $\gamma_{n,s}$ is a monotonic increasing function.

As a result, the derivation process of the third formula can be understood.

The present disclosure can improve the reliability of transmission. Please refer to FIG. 6 again. In one embodiment, when the delay limit is 1 ms, it means that the delay outage probability is defined as the probability that the transmission cannot reach the 1 ms delay limit in a certain situation. Then, it can be seen from FIG. 6 that the method of the present disclosure can enable 1000 users (λe=1000) using eMBB service to reach a reliability of about 0.00001 under the delay limit of 1 ms, which also indicates a delay standard in which there is only one transmission unable to reach 1 ins in average among 100,000 transmissions.

Figure 7:
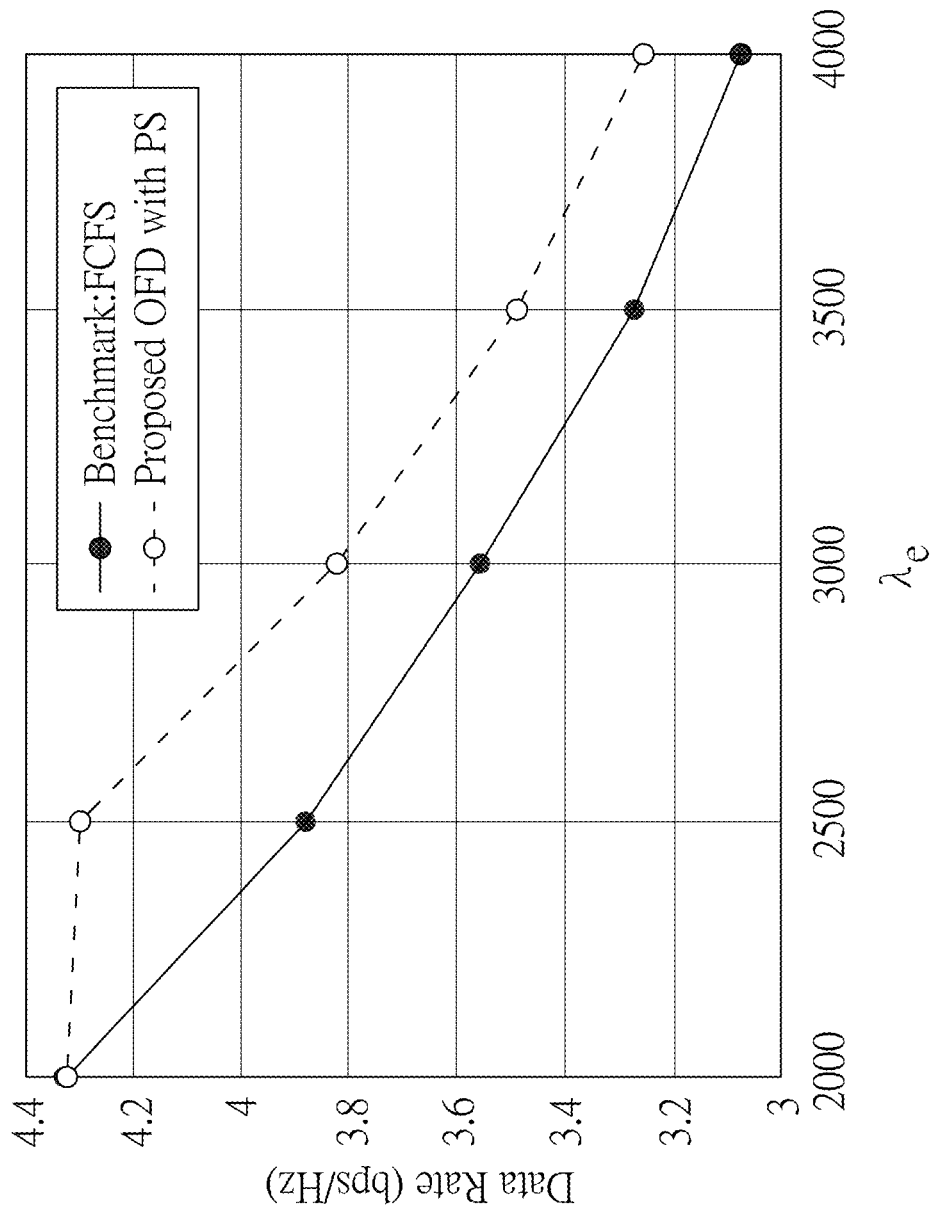
FIG. 7 is a system performance simulation diagram of a communication system according to an embodiment of the present disclosure versus existing system architecture.

The present disclosure can also provide good system performance. FIG. 7 is a system performance simulation diagram of a communication system (labeled as OFD) according to an embodiment of the present disclosure versus an existing system architecture (First-come-first-serve queue mechanism, labeled as FCFS), in which the data is shown as spectrum efficiency (bps/Hz). As shown in FIG. 7, when the number of users using eMBB service increases, although the overall transmission rate of the OFD architecture and the FCFS architecture will decrease, the OFD architecture has a better system performance in comparison with the existing FCFS architecture (that is, without using any measures). For example, when an operator uses a bandwidth of 100 MHz for transmission, it can reach a user transmission rate of 380 Mbps when there are 3000 eMBB users (λe=3000), while FCFS can only reach a user transmission rate of 360 Mbps.

With the communication system, communication method, and computer program product of the present disclosure, the processor of the base station can automatically allocate the functional split mode of each user equipment to achieve the effect of the minimum delay probability, so as to greatly improve the communication quality.

The aforementioned embodiments are examples only for convenience of description. The scope of the present disclosure is claimed hereinafter in the claims and is not limited to the embodiments.

What is claimed is:

1. A communication system, comprising:
a base station supporting a plurality of communication service types, wherein the base station includes:
a plurality of distributed units for connecting with a plurality of user equipment; and
a central unit connected with the distributed units; and
a main processor executing a control mode selection procedure to select a functional split mode corresponding to a user equipment according to current communication quality requirement of the user equipment, wherein the functional split mode includes a centralized control mode and a distributed control mode;
wherein, in the centralized control mode, the central unit allocates one or more distributed units corresponding to the user equipment and the central unit is responsible for communication scheduling of the user equipment and, in the distributed control mode, a distributed unit currently corresponding to the user equipment is responsible for communication scheduling of the user equipment.

2. The communication system of claim 1, wherein, for the control mode selection procedure, the main processor further compares a power level difference average value of the user equipment with a power level difference threshold of the distributed unit currently corresponding to the user equipment and, when the power level difference average value is smaller than or equal to the power level difference threshold, the main processor executes the centralized control mode, otherwise the main processor executes the distributed control mode, where the power level difference threshold is defined as a power level difference that the distributed unit has to comply with under a specific communication service type.

3. The communication system of claim 2, wherein the main processor further calculates the power level difference threshold of each distributed unit according to a number of user equipment currently corresponding to each distributed unit and a proportion of the user equipment using the specific communication service.

4. The communication system of claim 3, wherein the main processor further executes a feasible set reduction procedure to determine a general lower limit of one or more service allocation control ratios corresponding to the power level difference thresholds of the distributed units, where the feasible set reduction procedure includes the steps of:

using the main processor to obtain a minimum power level difference threshold of each distributed unit under the specific communication service type through a first conversion mechanism, wherein the first conversion mechanism is correlated to a conversion between a signal-to-noise ratio and a power level difference threshold that a user equipment must comply with under the specific communication service type;

using the main processor to obtain a service allocation control ratio corresponding to the minimum power level difference threshold of each distributed unit through a second conversion mechanism, wherein the second conversion mechanism is correlated to a conversion between a service allocation control ratio and a power level difference threshold, and the service allocation control ratio is defined as a proportion of one or more user equipment corresponding to a distributed unit and using the centralized control mode under a specific communication service type; and using the main processor to determine a minimum value among the service allocation control ratios of the distributed units, and setting the minimum value as the general lower limit.

5. The communication system of claim 4, wherein the main processor further executes a globally optimal solution search procedure to determine an optimal service allocation control ratio of each distributed unit, where the globally optimal solution search procedure includes the steps of:

using the main processor to a number of all user equipment using the specific communication service type, the general lower limit ($P_{L,s}$), and one or more service allocation control ratios of each distributed unit that comply with the general lower limit;

using the main processor to continuously and randomly select a service allocation control ratio that complies with the general lower limit, and applying the service allocation control ratio randomly selected each time together with a convergence threshold into a third conversion mechanism to calculate a minimum delay outage probability of the specific communication service type, where the convergence threshold is between 0.00005 and 0.0002; and using the main processor to execute a Newton method to determine an optimal service allocation control ratio of each distributed unit that complies with the minimum delay outage probability, wherein the optimal service allocation control ratio of each distributed unit is converted to an optimal value of the power level difference threshold of each distributed unit through the second conversion mechanism.

6. A communication method executed in a communication system comprising a base station supporting a plurality of communication service types and including a plurality of distributed units for connecting with a plurality of user equipment, a central unit connected with the distributed units, and a main processor, wherein the communication method comprising the steps of:

using the main processor to execute a control mode selection procedure to select a functional split mode corresponding to a user equipment according to current communication quality requirement of the user equipment, wherein the functional split mode includes a centralized control mode and a distributed control mode;

wherein, in the centralized control mode, the central unit allocates one or more distributed units corresponding to the user equipment and the central unit is responsible for communication scheduling of the user equipment and, in the distributed control mode, a distributed unit currently corresponding to the user equipment is responsible for communication scheduling of the user equipment.

7. The communication method of claim 6, wherein the control mode selection procedure further includes the steps of: using the main processor to compare a power level difference average value of the user equipment with a power level difference threshold of the distributed unit currently corresponding to the user equipment and, when the power level difference average value is smaller than or equal to the power level difference threshold, using the main processor to execute the centralized control mode, otherwise using the main processor to execute the distributed control mode, where the power level difference threshold is defined as a power level difference that the distributed unit has to comply with under a specific communication service type.

8. The communication method of claim 7, further comprising the step of: using the main processor to calculate the power level difference threshold of each distributed unit according to a number of user equipment currently corresponding to each distributed unit and a proportion of the user equipment using the specific communication service.

9. The communication method of claim 8, wherein the main processor further executes a feasible set reduction procedure to determine a general lower limit of one or more service allocation control ratios corresponding to the power level difference thresholds of the distributed units, where the feasible set reduction procedure includes the steps of:

using the main processor to obtain a minimum power level difference threshold of each distributed unit under the specific communication service type through a first conversion mechanism, wherein the first conversion mechanism is correlated to a conversion between a signal-to-noise ratio and a power level difference threshold that a user equipment must comply with under the specific communication service type;

using the main processor (16) to obtain one or more service allocation control ratios corresponding to the minimum power level difference threshold of each distributed unit through a second conversion mechanism, wherein the second conversion mechanism is correlated to a conversion between a service allocation control ratio and a power level difference threshold, and the service allocation control ratio is defined as a proportion of one or more user equipment corresponding to a distributed unit and using the centralized control mode under a specific communication service type; and using the main processor to determine a minimum value among the service allocation control ratios of the distributed units, and setting the minimum value as the general lower limit.

10. The communication method of claim 9, wherein the main processor further executes a globally optimal solution search procedure to determine an optimal service allocation control ratio of each distributed unit, where the globally optimal solution search procedure includes the steps of:

using the main processor to a number of all user equipment using the specific communication service type, the general lower limit, and one or more service allocation control ratios of each distributed unit that comply with the general lower limit;

using the main processor to continuously and randomly select a service allocation control ratio that complies with the general lower limit, and applying the service allocation control ratio randomly selected each time together with a convergence threshold into a third conversion mechanism to calculate a minimum delay outage probability of the specific communication service type, where the convergence threshold is between 0.00005 and 0.0002; and using the main processor to execute a Newton method to determine an optimal service allocation control ratio of each distributed unit that complies with the minimum delay outage probability, wherein the optimal service allocation control ratio of each distributed unit is converted to an optimal value of the power level difference threshold of each distributed unit through the second conversion mechanism.

11. A non-transitory computer program product executed by a main processor of a communication system including a base station supporting a plurality of communication service types and including a plurality of distributed units for connecting with a plurality of user equipment, a central unit connected with the distributed units, and a main processor, wherein the non-transitory computer program product comprises:

an instruction causing the main processor to execute a control mode selection procedure to select a functional split mode corresponding to a user equipment according to current communication quality requirement of the user equipment, wherein the functional split mode includes a centralized control mode and a distributed control mode;

wherein, in the centralized control mode, the central unit allocates one or more distributed units corresponding to the user equipment and the central unit is responsible for communication scheduling of the user equipment and, in the distributed control mode, a distributed unit currently corresponding to the user equipment is responsible for communication scheduling of the user equipment.

* * * * *